(12) United States Patent
Kiwada et al.

(10) Patent No.: US 7,100,298 B2
(45) Date of Patent: Sep. 5, 2006

(54) STEP AND GAP MEASURING INSTRUMENT (75) Inventors: Takefumi Kiwada, Nakatsugawa (JP); Munenori Ishii, Nakatsugawa (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/044,435

(22) Filed: Jan. 27, 2005

(65) Prior Publication Data
US 2005/0166415 A1 Aug. 4, 2005

(30) Foreign Application Priority Data
Jan. 30, 2004 (JP) .............................. 2004-023039

(51) Int. Cl.
*G01B 7/14* (2006.01)
(52) U.S. Cl. ......................................... 33/613; 33/613
(58) Field of Classification Search .................. 33/194, 33/544.4, 546, 548, 600, 613, 645, 783, 784
See application file for complete search history.

(56) References Cited
U.S. PATENT DOCUMENTS

| | | | |
|---|---|---|---|
| 4,345,380 A * | 8/1982 | Vis .............................. | 33/784 |
| 4,473,952 A * | 10/1984 | Mariani ........................ | 33/542 |
| 4,536,964 A * | 8/1985 | Lazes ........................... | 33/531 |
| 4,606,129 A | 8/1986 | Barrowman et al. | |
| 4,731,935 A * | 3/1988 | Struble ........................ | 33/546 |
| 5,551,162 A * | 9/1996 | Struble ........................ | 33/546 |
| 5,657,550 A | 8/1997 | Struble | |
| 2005/0081400 A1* | 4/2005 | Matsumiya et al. .......... | 33/706 |

FOREIGN PATENT DOCUMENTS

| | | |
|---|---|---|
| EP | 0 833 132 A2 | 4/1998 |
| JP | 07-113603 | 5/1995 |
| JP | 2002-250601 | 9/2002 |
| JP | 2003-042706 | 2/2003 |

* cited by examiner

*Primary Examiner*—G. Bradley Bennett
(74) *Attorney, Agent, or Firm*—Rankin, Hill, Porter & Clark LLP (57) ABSTRACT

A contact block (31) is provided with a flat face portion (311A) parallel with the axis of a spindle (12) and a conical face portion (311B) that comes closer to the flat face portion (311A) along the axial direction of the spindle (12) in the direction of going away from the spindle (12). Even in the case of a shape formed by integrating a step and a gap inseparably, since the flat face portion (311A) is parallel with the axis of the spindle (12), it is possible to insert the contact block (31) into the gap while the axis of the spindle (12) is kept perpendicular to the direction of the gap, hence it is possible to measure the gap W accordingly.

6 Claims, 12 Drawing Sheets

STEP AND GAP MEASURING INSTRUMENT

BACKGROUND OF THE INVENTION

1. Field of the Invention

The present invention relates to a step and gap measuring instrument, more specifically to a step and gap measuring instrument that is provided with a spindle disposed on a case body movably in the axial direction of the spindle and a contact point disposed at one end of the spindle, and measures the height of a step and/or the width of a gap by making the contact point abut a workpiece.

2. Description of Related Art

Conventionally, a dial gage or the like has been used for the measurement of a step and a caliper or the like for the measurement of a gap. As a consequence, there has been such problems that, when it is attempted to measure both a step and a gap of a workpiece, at least two kinds of measuring instruments have been required, for example, a dial gage or the like firstly to measure a step and a caliper or the like secondly to measure a gap, and that has involved an immense amount of time and effort.

As a means of solving the problem, an inside measuring instrument is proposed in Japanese Unexamined Patent Publication No. Hei7-113603. The inside measuring instrument is configured so as to be equipped with: a case body; a spindle disposed on the case body movably in the axial direction thereof; a conical contact point that is disposed at the tip of the spindle and has a conical side face abutting a workpiece; a displacement detector that detects the displacement of the spindle; a computation controller that computes the gap between the measuring portions of the workpiece on the basis of the displacement of the spindle detected by the displacement detector and a constant based on the conical shape of the contact point and displays the computation results on a digital display; and a reference piece that is attached to the case body and provides a reference end face.

Such an inside measuring instrument makes it possible to measure a gap of a workpiece by inserting a contact point into the gap. Firstly, the contact point is inserted into a gap until the reference end face of a reference piece abuts the reference flat face of a workpiece. By so doing, the spindle moves in such a direction that the spindle is squeezed in the case body and the displacement is detected by the displacement detector. The computation controller computes the gap of the workpiece on the basis of the detected displacement and a constant based on the conical shape of the contact point and displays the computation result on the digital display, and consequently an operator can know the gap by reading the result on the digital display.

Further, since the inside measuring instrument can be also used as a conventional dial gage, it is possible to measure a step as well by using it.

That is, by using the inside measuring instrument, both a step and a gap can be measured with a single instrument.

Figure 12:
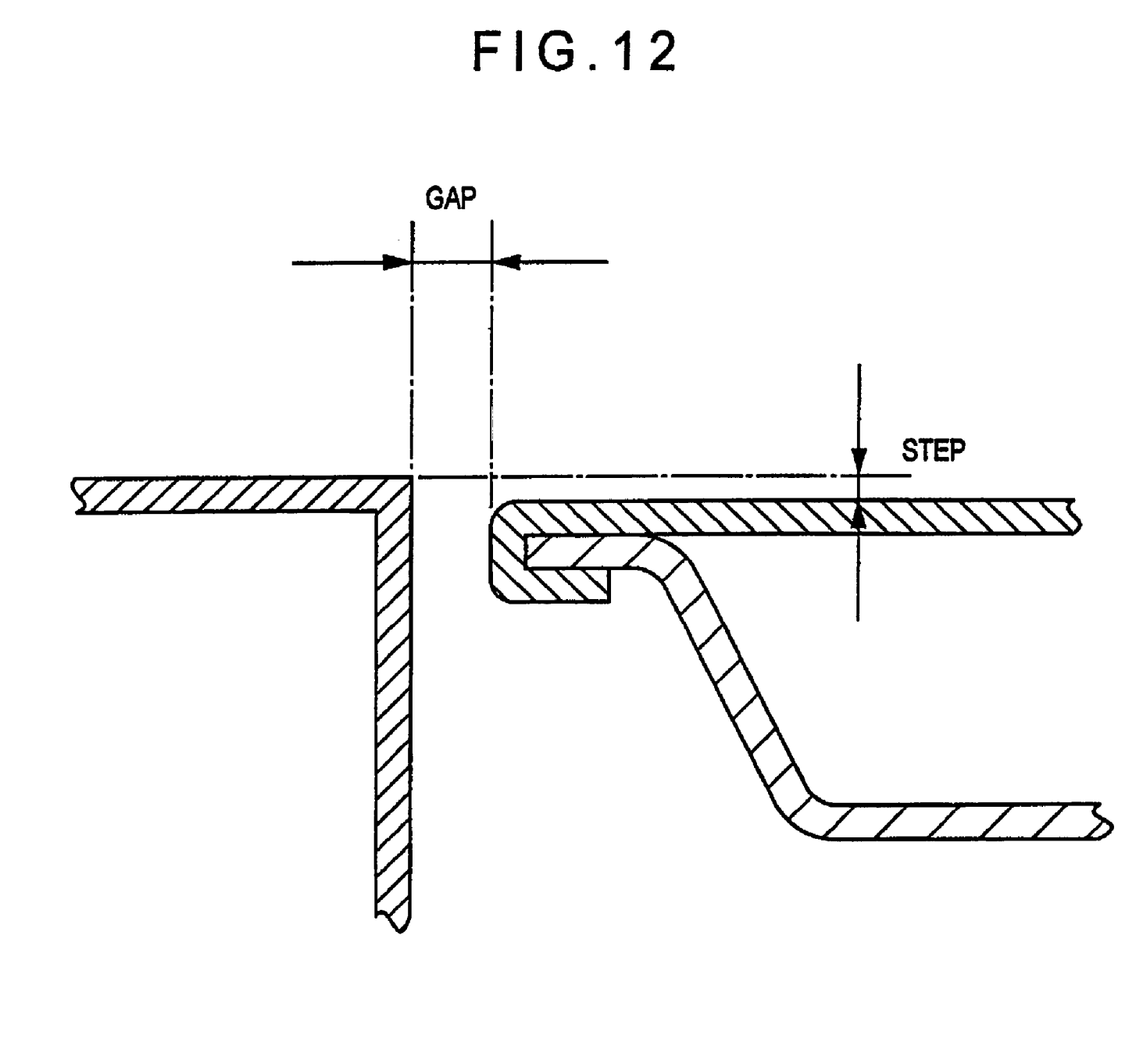
FIG. 12 is a view showing an example of a shape formed by integrating a step and a gap inseparably.

With an inside measuring instrument disclosed in the aforementioned patent document however, a gap cannot be measured in the case of a shape formed in such a way as integrating a step and a gap inseparably as shown in FIG. 12. That is, since the shape of the contact point of the inside measuring instrument is conical, it is impossible to insert the conical contact point perpendicularly to the gap in such a case as shown in FIG. 12, and consequently the gap cannot be measured.

SUMMARY OF THE INVENTION

The main object of the present invention is to provide a step and gap measuring instrument capable of measuring a step and a gap even in the case of a shape formed by integrating the step and the gap inseparably.

A step and gap measuring instrument according to the present invention, the instrument is provided with: a case body; a spindle disposed on the case body movably in the axial direction thereof; a contact point being disposed at one end of the spindle and abutting a workpiece; a retainer that retains the case body in a predetermined posture; a displacement detector that detects the displacement of the spindle; and a display that displays the displacement detected by the displacement detector, wherein the contact point is provided with a step measuring portion and a gap measuring portion which abut the workpiece, the gap measuring portion is formed into a shape that contains one contour line and the other contour line that abut the workpiece at the time of gap measurement; the one contour line is formed in the direction parallel with the axial direction of the spindle; and the other contour line is formed so as to come closer to the one contour line along the axial direction of the spindle in the direction of going away from the spindle.

With the step and gap measuring instrument according to the present invention, a step can be measured by making the step measuring portion of the contact point abut the step portions of a workpiece sequentially and reading the difference of the measured values.

Meanwhile, a gap is measured by moving the spindle in the state of keeping the axis of the spindle perpendicular to the direction of the gap to be measured and inserting the contact point into the gap until the gap measuring portion abuts the two opposed faces that compose the gap. The distance of the insertion of the contact point into the gap is detected as the displacement of the spindle by the displacement detector and displayed by the display. Here, the shape of the contact point is a given and an operator can obtain the width of the gap by computation and the like based on the displayed insertion amount and the given contact point shape.

In the present invention, a gap can be measured even in the case of a shape formed by integrating a step and a gap inseparably. In the case of such a shape, a gap is formed between two opposed faces, the one opposed face prolonged from a flat face on one side that is closer to the measuring instrument and the other opposed face prolonged from another flat face on the other side that is farther from the measuring instrument. In this case, a gap may be measured by inserting a contact point into the gap so as to make one contour line abut one opposed face and the other contour line abut the other opposed face. Since the one contour line is parallel with the axial direction of the spindle, it is possible to insert the contact point into the gap while the axis of the spindle is kept perpendicular to the direction of the gap and consequently the gap can be measured.

In the present invention, it is preferable to be configured so that the opposite contour line is a straight line that forms an angle of 45° with the first contour line; and the step measuring portion is formed on the intersection of the extension of the one contour line and the extension of the opposite contour line.

In the present invention, when a contact point is inserted into a gap at the time of gap measurement, the amount by which a step measuring portion intrudes into the gap coincides with the gap. Since the amount by which a step measuring portion intrudes into the gap is equal to the displacement of a spindle and is shown on a display, an operator can know the gap merely by reading the shown value. That is, at the time of gap measurement, it becomes unnecessary for an operator to calculate considering a shape of contact point to know the gap, and consequently time and effort of measurement can be reduced.

In the present invention, it is preferable, in the case of gap measurement, to be configured so that the instrument is provided with: a computation controller that computes a gap of workpiece on the basis of a displacement of the spindle detected by a displacement detector and a shape of a contact point, and the display switching section that makes a display to show the displacement of the spindle detected by the displacement detector at the time of step measurement and the gap computed by the computation controller at the time of gap measurement.

At the time of gap measurement, since the present invention makes it possible to show on a display the gap computed by a computation controller using a display switching section, the gap can directly be read. As a consequence, it becomes unnecessary for an operator to compute considering the shape of a contact point to know the gap and time and effort of measurement can be reduced accordingly.

In the present invention, it is preferable that at least either contour line out of the one contour line or the other contour line is formed on a curved face portion of a surface of the contact point.

When a measuring instrument is configured so that one or the other contour line is formed as an intersection line between flat face portions of the contact point surface and protrudes in the form of a corner on the contact point surface, at the time of gap measurement, the contact point abuts a workpiece at the corner on the contact point surface, and consequently the workpiece and the contact point are likely to be damaged. In contrast, in the case of the present invention, at the time of gap measurement, the contact point abuts the workpiece at the curved face portion of the contact point, and consequently not only the workpiece but also the contact point can be prevented from being damaged.

Further, in such a case as to measure the inner diameter of a circular hole, measurement error is caused by a contact point that is configured so that one or the other contour line is formed on the flat face portion of the contact point surface. That is, since the flat face portion of the contact point surface cannot be inscribed in the inner wall of the circular hole, the one and the other contour line also cannot abut the inner wall and thus, the inner diameter measurement in such a state can not provide an accurate inner diameter. In contrast, in the present invention, by forming beforehand the curved face portion of the contact point surface so as to be able to be inscribed in the inner wall of the circular hole, the gap measuring portion can abut the inner wall to be measured and thus such measurement error as mentioned above does not occur. That is, the present invention makes it possible to measure an inner portion without causing any measurement error regardless of the shapes of a gap, an inner diameter and the like.

In the present invention, it is preferable to be configured so that: the contact point is provided with one columnar member and the other columnar member; one contour line is formed on the side surface of the one columnar member in the axial direction thereof; and the other contour line is formed on the side surface of the other columnar member in the axial direction thereof.

In general, it is difficult and requires time and effort to form one or the other contour line on the curved face portion of a contact point surface, for example, it is necessary to scrape the contact point surface with a high degree of accuracy. In contrast, the present invention only requires to attach columnar members that are easily produced as parts of the contact point. As a result, the present invention makes it possible to produce a contact point easily.

In the present invention, it is preferable to be configured so that the step measuring portion is a flat face perpendicular to the axial direction of the spindle.

In a measuring instrument wherein the tip of a contact point is sharp and the tip is a step measuring portion, at the time of step measurement, a heavy pressure is imposed on both the step measuring portion and a workpiece and thus both of them are likely to be damaged. In contrast, according to the present invention, at the time of step measurement, since the contact point abuts a workpiece at the flat face portions, the pressure imposed on both the step measuring portion and the workpiece reduces and thus both of them are hardly damaged.

DETAILED DESCRIPTION OF PREFERRED EMBODIMENTS

Embodiments according to the present invention are hereunder explained on the basis of the drawings.

First Embodiment

Figure 1:
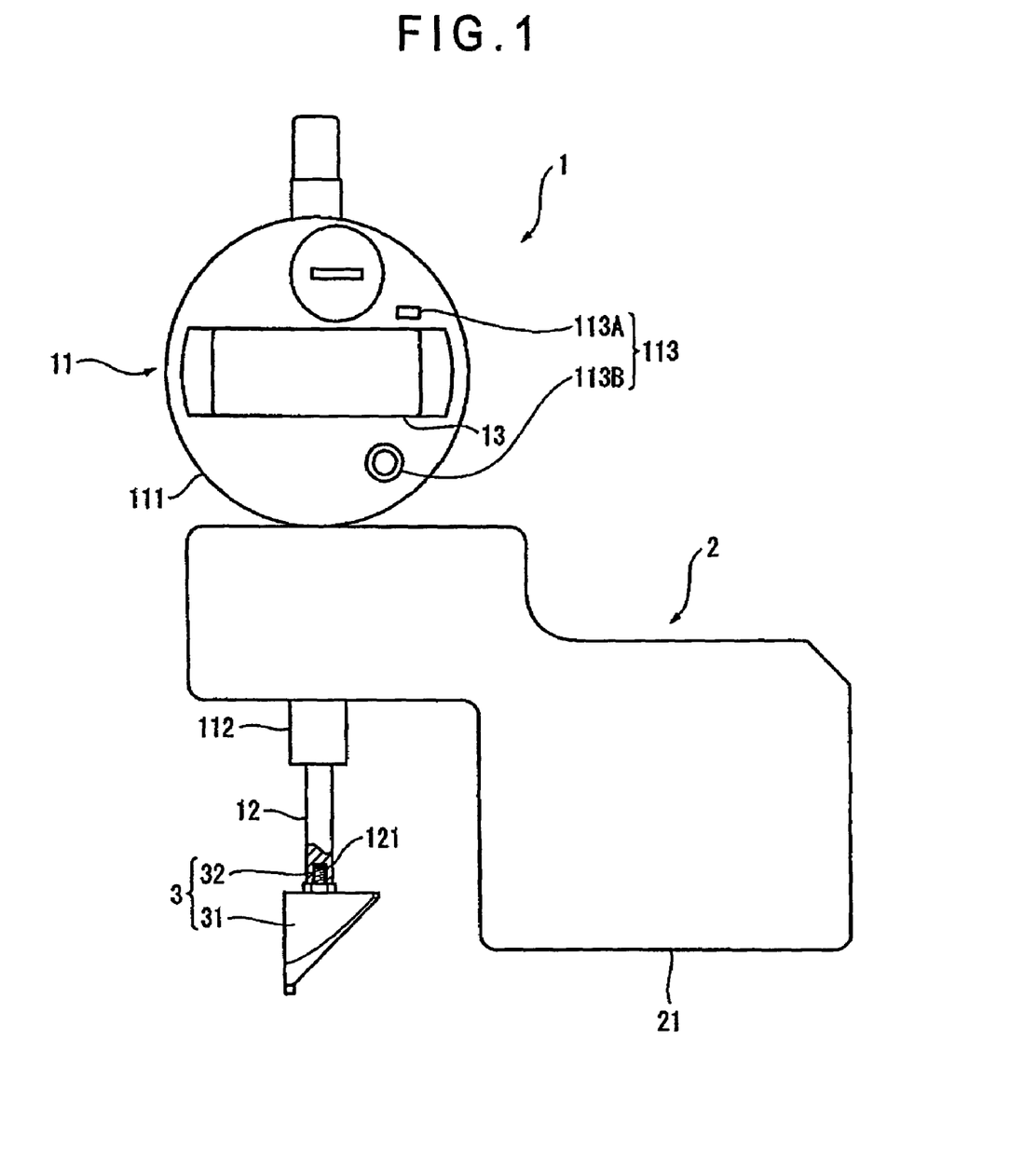
FIG. 1 is a front view showing a step and gap measuring instrument of the first embodiment according to the present invention.

FIG. 1 shows a step and gap measuring instrument of the first embodiment according to the present invention. The step and gap measuring instrument is equipped with a dial gage 1, a base 2, made of resin, acting as a retainer that retains the dial gage in a predetermined posture, and a contact point 3 attached to the dial gage 1.

The dial gage 1 is equipped with: a case body 11; a spindle 12 disposed on the case body 11 so as to be movable in the axial direction of the spindle 12; a displacement detector (not shown in the figure) to detect the displacement of the spindle 12; and a digital display 13 digitally displaying the displacement of the spindle 12 detected by the displacement detector.

The case body 11 is equipped with: a case 111; a nearly cylindrical stem 112 disposed on the circumferential wall surface of the case 111; and a switch unit 113 disposed at the front face portion of the case. The switch unit 113 is composed of a power supply on/off switch 113A and a zero-set button 113B.

The spindle 12 is attached to the case body 11 in the manner of being supported by the stem 112. At one end of the spindle 12 (the lower end thereof in FIG. 1), a tapped hole 121 with female thread is formed.

The base 2 is attached to the stem 112. The base 2 has a measurement reference plane 21 perpendicular to the axial direction of the spindle 12 and, on the basis of it, the dial gage 1 can be retained in a predetermined posture, namely a posture wherein the spindle 12 is perpendicular to the measurement reference plane 21.

The contact point 3 is provided with a contact block 31 and a thread portion 32. The thread portion 32 is formed by male thread cutting and the contact point 3 is attached to the spindle 12 by screwing the male thread to the tapped hole 121 of the spindle 12.

Figure 2:
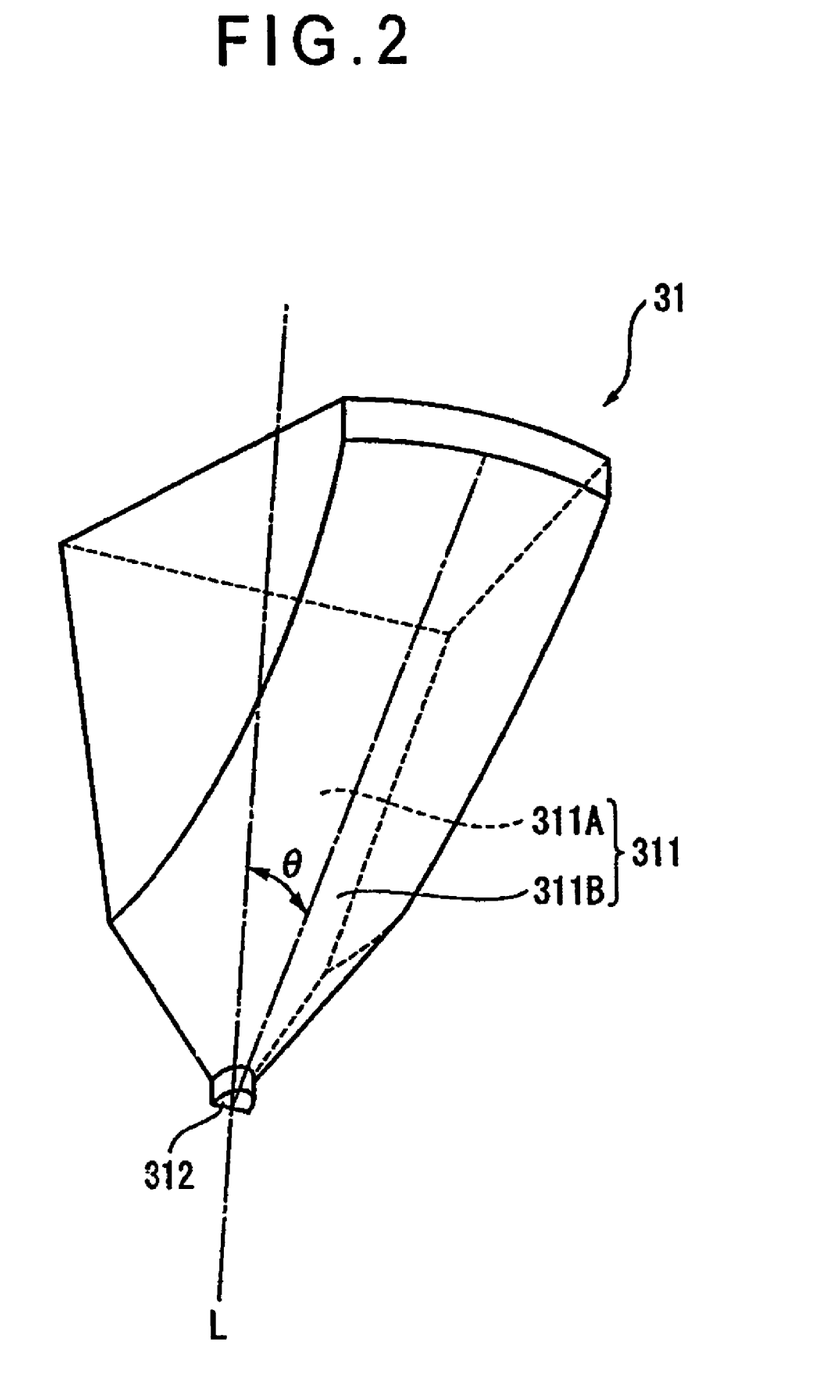
FIG. 2 is a perspective view showing a measuring portion of the first embodiment
Figure 3:
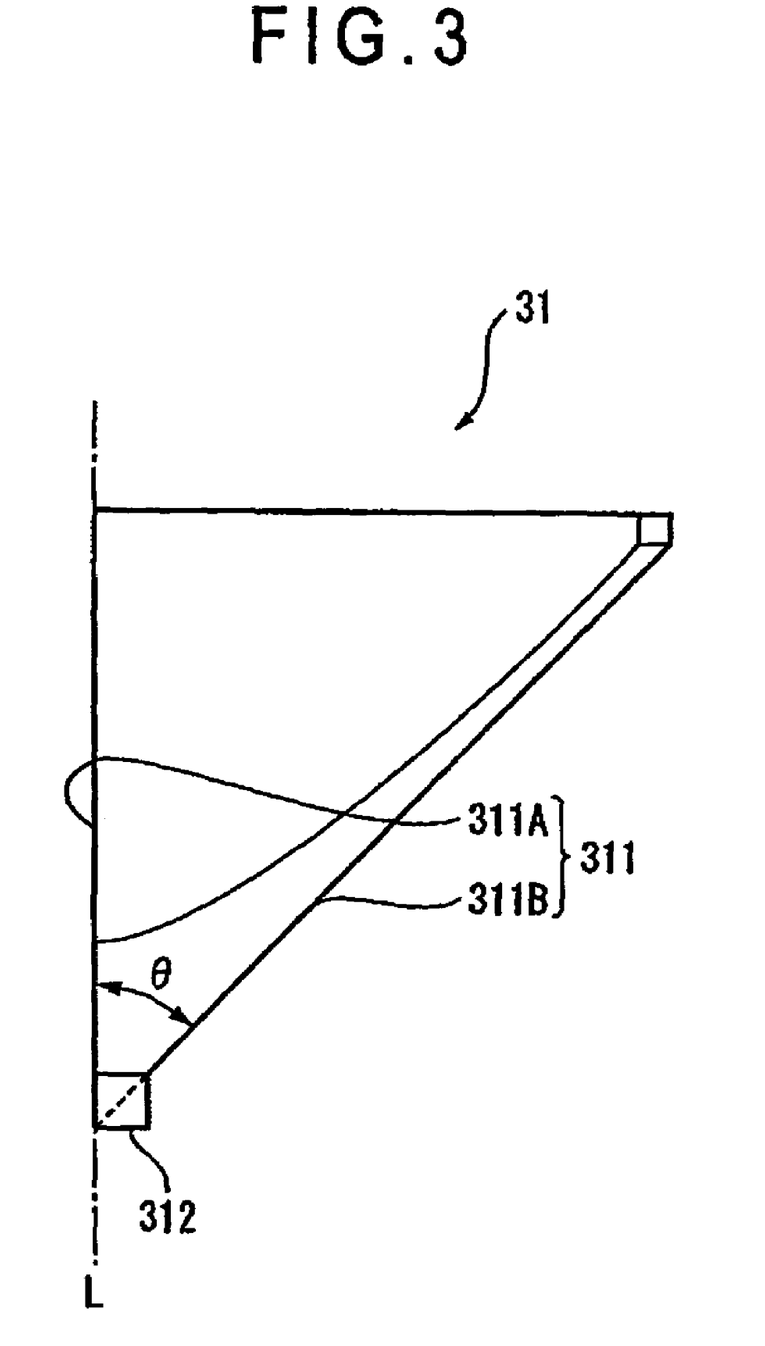
FIG. 3 is a front view showing a measuring portion of the first embodiment.

FIGS. 2 and 3 are the perspective view and the front view of the contact block 31 respectively. The contact block 31 is made of resin and provided with a gap measuring portion 311 and a step measuring portion 312.

The gap measuring portion 311 is composed of a flat face portion 31 IA and a conical face portion 311B in the surface of the contact block 31. The flat face portion 311A is a face parallel with the axial direction of the spindle 12 (the vertical direction in FIG. 3). The conical face portion 311B is a side face portion of a cone formed around the axis of the straight line L parallel with the axis of the spindle 12 on the flat face portion 311A. Further, the angle θ between the axis (the straight line L) and the generatrix of the cone is 45 degrees. By the way, in the present embodiment, one contour line is the axis (the straight line L) of the cone and the other contour line is an arbitrary generatrix of the cone on the conical face portion 311B. Consequently, the one contour line is parallel with the axial direction of the spindle 12 and the other contour line is formed so as to come closer to the one contour line along the axial direction of the spindle 12, and according as it is directed away from the case body 11 toward an end of the spindle 12 (the lower end in FIG. 1). In this way, the contact block 31 abuts a workpiece on both contour lines. Here, since the other contour line is on the conical face portion 311B, it is formed so as to be on the curved face portion of the contact point 3.

The step measuring portion 312 is a flat face portion perpendicular to the axial direction of the spindle 12 and is disposed at the apex of the cone. That is, the step measuring portion 312 is located at the intersection of the extension of the one contour line (the axis of the cone) and the extension of the other contour line (the generatrix of the cone).

The contact block 31 is fabricated through the following procedure.

Firstly, a resin block used as the material of the contact block 31 is cut with a lathe or the like to form a shape of a truncated cone with a columnar protrusion coaxially protruding from the apex of the truncated cone. Here, the circular shape of the apex of the truncated cone and the circular shape of the bottom of the columnar protrusion are identical and formed so as to completely overlap each other. Note that the apex of the columnar protrusion is formed into a flat face perpendicular to the axes of the truncated cone and the columnar protrusion itself.

Next, the fabricated resin is cut into half along a plane containing the axes of the truncated cone and the columnar protrusion. Thereafter, the portions which are not directly used for measurement (the portions of the front face and back face in FIG. 2) are further cut off for the purpose of weight reduction, downsizing and the like.

At this moment, only the difference from the contact block 31 shown in FIG. 2 is the length of the protrusion (the portion of the half columnar shape, the apex of which is used as the step measuring portion 312 in FIG. 2). Here, the protrusion is formed beforehand so that the length thereof (the length of the columnar protrusion) is longer than the length of the protrusion of the contact block 31. By so doing, it becomes possible to: reduce the length gradually by cutting the protrusion; terminate the cutting at the time when the length is identical to the length of the protrusion intended in the contact block 31; and resultantly fabrication of the contact block 31 shown in FIG. 2 is accomplished.

Next, a method for measuring the height of a step or the width of a gap by using a step and gap measuring instrument of the present embodiment is explained.

Figure 4:
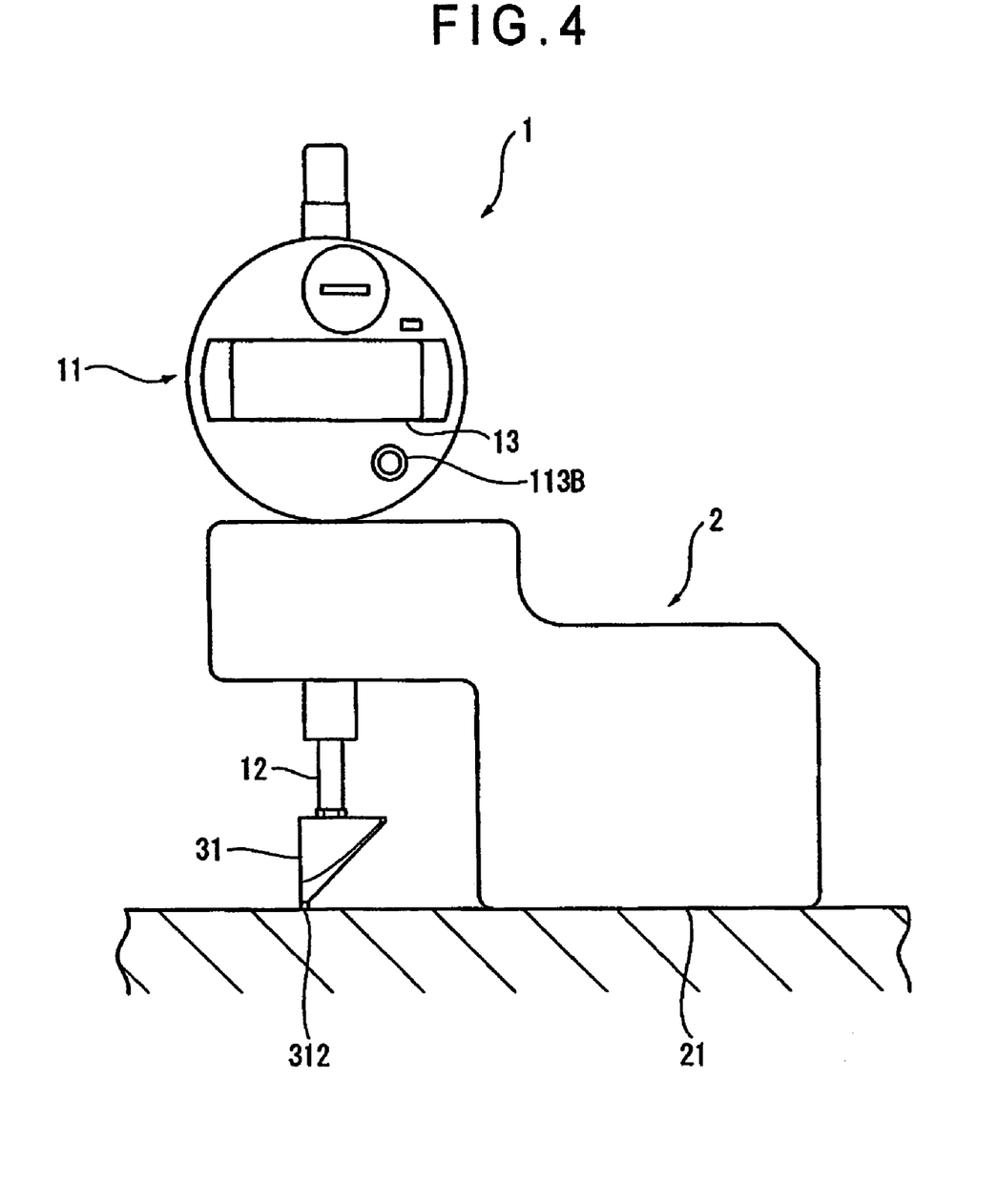
FIG. 4 is a view showing the state of zero-setting in the first embodiment.
Figure 5:
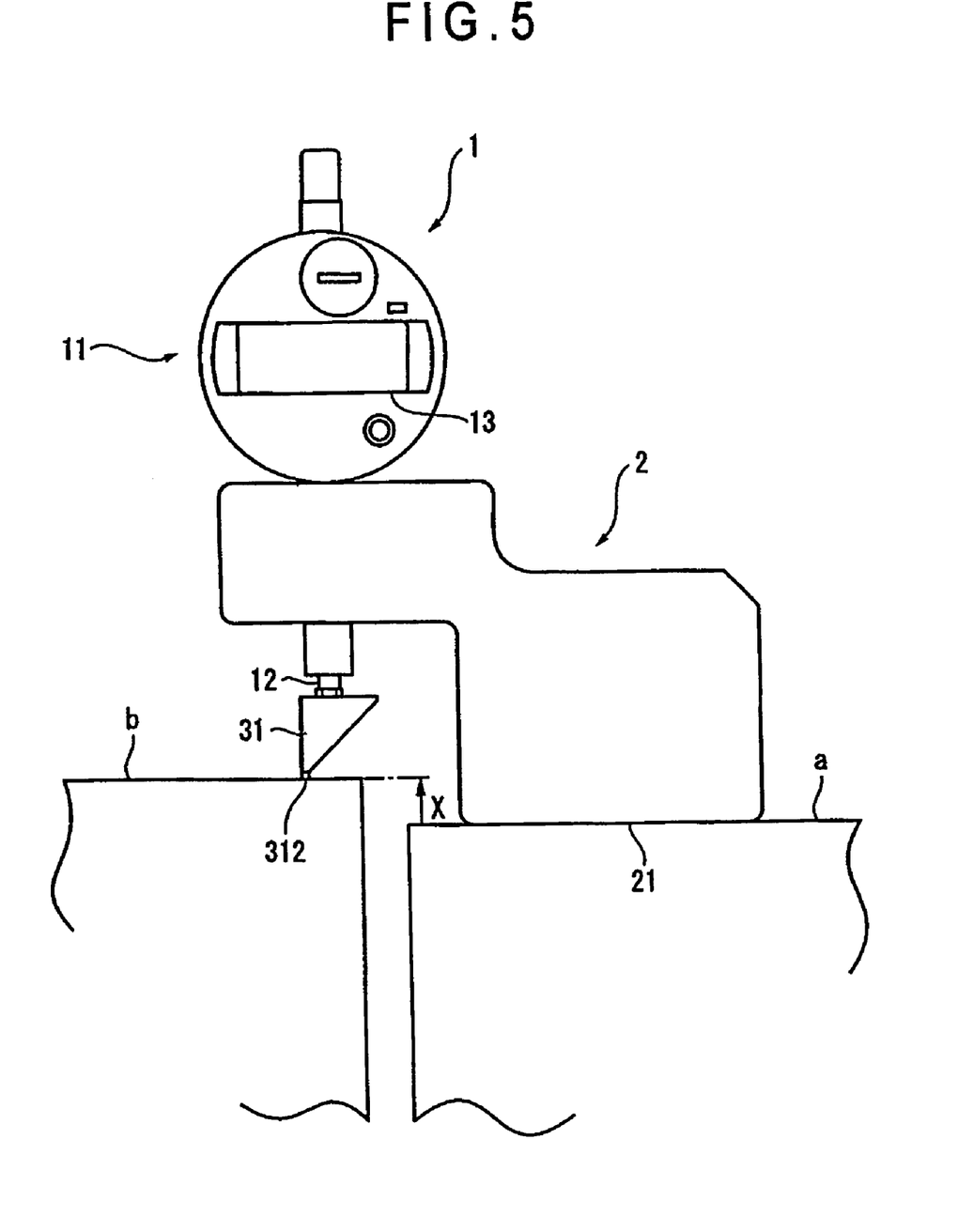
FIG. 5 is a view showing the state of step measurement in the first embodiment.

In the case of step measurement, firstly as shown in FIG. 4, the measuring instrument is thrust against a flat face until the measurement reference plane 21 abuts the flat face, thus the step measuring portion 312 abuts the flat face, and zero-setting is performed in that state in advance by pushing the zero-set button 113B. The value displayed on the digital display 13 at this time is zero. Subsequently, as shown in FIG. 5, the measurement reference plane 21 abuts the lower flat face a (the right side in the case of FIG. 5) of the two flat faces that compose a step and also the step measuring portion 312 abuts the higher flat face b. At this moment, the spindle 12 is displaced from the zero-set position at the distance X that is equal to the step height, the displacement is detected by the displacement detector (not shown in the figure) and displayed on the digital display 13, and thus an operator can directly read the step height X accordingly.

Next, the case of gap measurement is explained. In particular, gap measurement in the case of a shape formed by integrating a step and a gap inseparably is explained hereunder. It goes without saying that a gap not integrated with a step can also be measured in the same way as a gap integrated with a step that is explained below.

Figure 6:
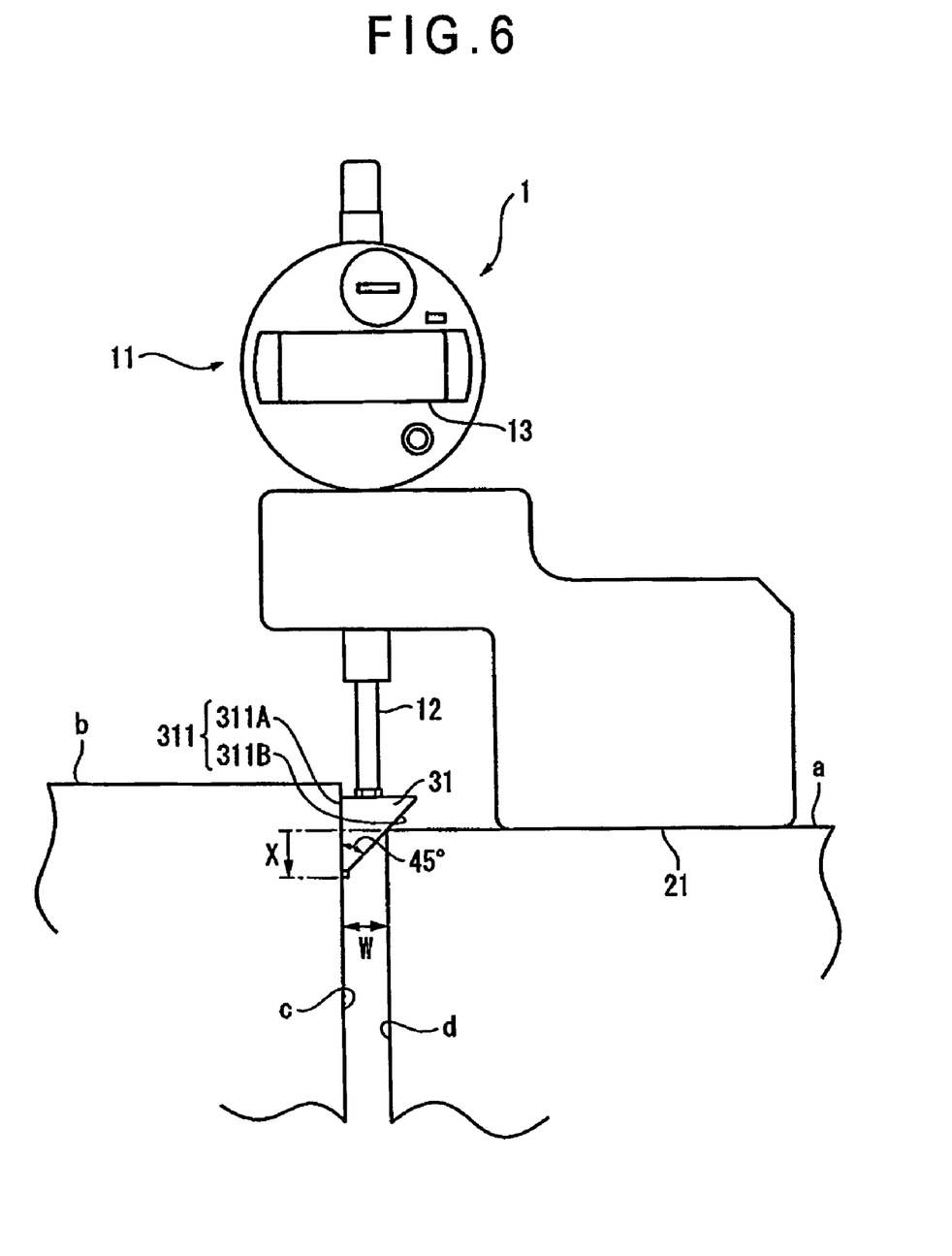
FIG. 6 is a view showing the state of gap measurement in the first embodiment.

In the case of gap measurement too, firstly, zero-setting is performed beforehand as shown in FIG. 4. Thereafter, as shown in FIG. 6, the measurement reference plane 21 abuts the lower flat face a (the right side in the case of FIG. 6) of the two flat faces that compose a step and also the gap measuring portion 311 abuts two opposed faces that compose the gap. For more detail, the flat face portion 311A of the gap measuring portion 311 abuts the opposed face c that continues from the higher flat face b and the conical face portion 311B abuts the opposed face d that continues from the flat face a. At this moment, the spindle 12 is displaced from the zero-set position by a distance X shown in FIG. 6 and the value X is displayed on the digital display 13. Here, since the angle θ between the axis and the generatrix of the cone is 45 degrees in the present embodiment, the gap W equals the displacement X of the spindle 12. Consequently, an operator can directly read the gap W from the display on the digital display 13.

The present embodiment produces the following effects:

(1) As shown in FIG. 6, since the flat face portion 311A of the gap measuring portion 311 is parallel with the axis of the spindle 12, it is possible to insert the contact block 31 into a gap and thus measure the gap even when a step and the gap are integrated inseparably.

(2) As shown in FIG. 6, not only a step height but also a gap is directly displayed on the digital display 13 and thus an operator can read them directly. As a consequence, it becomes unnecessary for an operator to compute considering the shape of a contact point to know the gap and resultantly time and effort for measurement can be reduced.

(3) As shown in FIG. 6, the flat face portion 311A and the conical face portion 311B abut a workpiece (the opposed faces c and d) at the time of gap measurement. As a consequence, the workpiece and the contact block 31 are hardly damaged in comparison with such a configuration as an angular portion of the contact block surface abuts the workpiece.

(4) Since the step measuring portion 312 is the flat face portion perpendicular to the axial direction of the spindle 12, neither a workpiece nor the step measuring portion 312 is damaged when it abuts the workpiece (the flat face b) at the time of step measurement as shown in FIG. 5.

(5) Since the contact block 31 is made of resin, neither a workpiece nor the contact block 31 is damaged when it abuts the workpiece at the time of step or gap measurement.

(6) Since it is generally easy to fabricate a block of a conical shape with a high degree of accuracy, the contact block 31 formed on the basis of a conical shape can be produced at a low cost and moreover can reduce measurement errors.

(7) In the present embodiment, it is necessary to form the step measuring portion 312 of a flat face precisely at the apex of the cone of the contact block 31 in order to increase the accuracy of step and gap measurement. However, if it is attempted to fabricate such a contact block 31 as shown in FIG. 2 by cutting the resin used as the material of the contact block 31 with only one cutting pass, it is likely to produce errors in the position and shape of the step measuring portion 312 and consequently the measuring accuracy may be deteriorated. Specifically, inaccuracy in the position and shape that, even though it is minor, may largely affect the measuring accuracy is caused as exemplified by the cases where: the step measuring portion 312 is not accurately formed at the apex of the cone; the step measuring portion 312 is not formed into a plane accurately perpendicular to the axial direction of the spindle 12; or minute irregularity is formed on the surface of the step measuring portion 312.

On the other hand, in the present embodiment, firstly a truncated cone having a coaxial columnar protruded from the apex thereof is precisely fabricated with a lathe or the like. Thereafter, through the processes mentioned earlier, the contact block 31 incorporating the step measuring portion 312 is fabricated finally by cutting to shorten the protrusion length formed longer beforehand.

By this procedure, it becomes possible to adjust the length of the protrusion to a desired length (the length of the protrusion in the contact block 31) through the cutting processes, and as a consequence it is possible to form the step measuring portion 312, which is to be formed at the apex of the protrusion, accurately at the position of the apex of the cone. Further, it becomes possible to adjust the shape of the tip face of the protrusion (the portion used as the step measuring portion 312) into an accurately flat face (perpendicular to the axial direction of the spindle 12) during the steps of the cutting of the protrusion. Consequently, inaccuracy in the position and shape of the step measuring portion 312 is not caused and thus the deterioration of measuring accuracy can be prevented.

Second Embodiment

In the explanations of the second embodiment according to the present invention, duplicate parts with the first embodiment are simplified. In particular, with regard to the constituents that are identical or equivalent to the constituents of the first embodiment, the same reference characters are used and the explanations are omitted or simplified accordingly.

Figure 7:
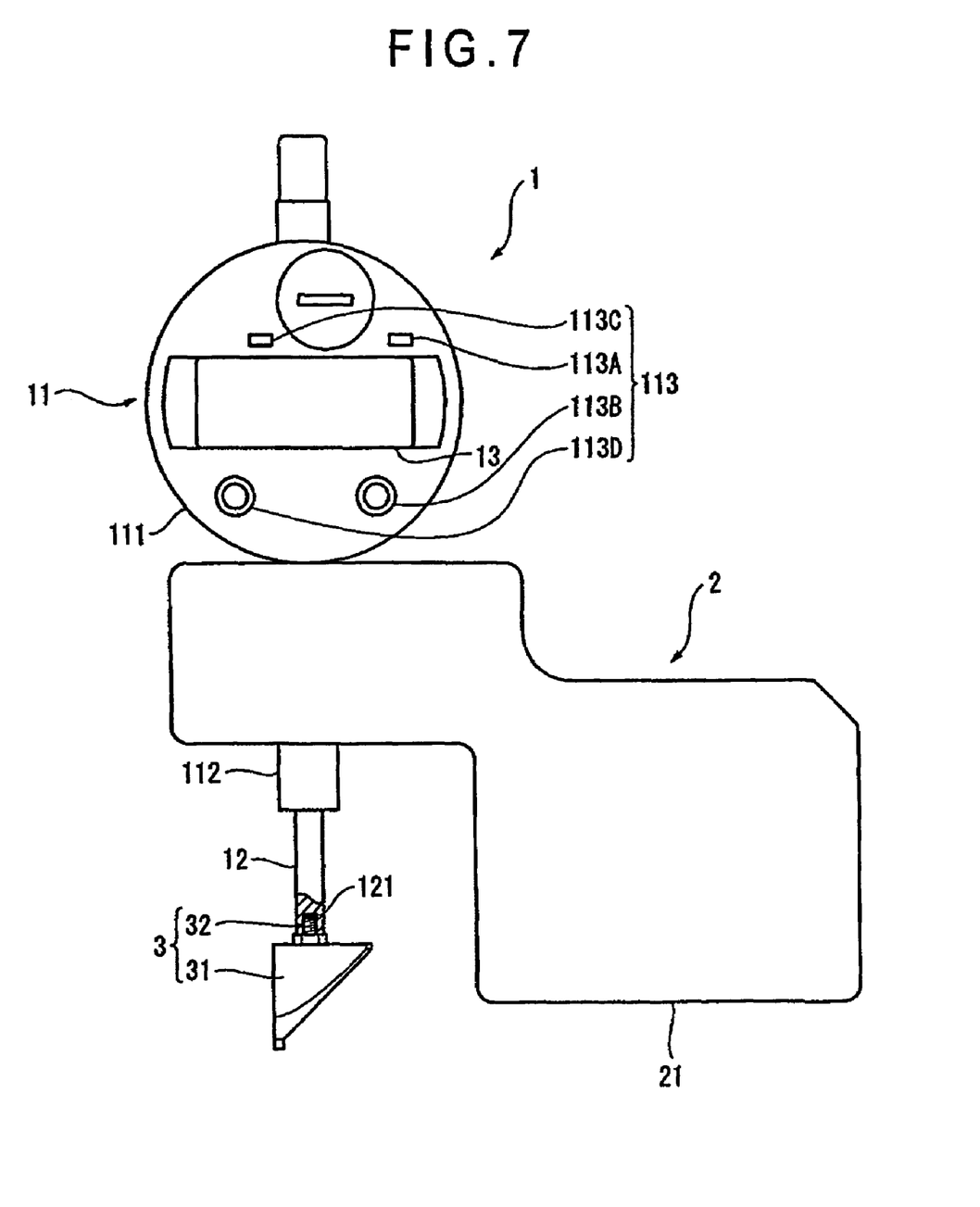
FIG. 7 is a front view showing a step and gap measuring instrument of the second embodiment.

A step and gap measuring instrument of the second embodiment is configured as shown in FIG. 7. In the interior of the dial gage 1, a computation controller 15 (not shown in FIG. 7) and a memory 16 (also not shown in FIG. 7) are disposed.

The switch unit 113 is provided with the mode selection switch 113C as a display switching section and the preset switch 113D. The mode selection switch 113C is a switch to select a measuring mode. As measuring modes, there are a step measuring mode, a gap measuring mode and an R-compensation gap measuring mode. Here, the R-compensation gap measuring mode means a measuring mode wherein, when an opposed face composing a gap forms a circular arc contour line of a radius R (refer to FIG. 10), the computation controller 15 computes on the basis of the value of R and then the accurate gap determined after taking the value of R into consideration is displayed on the digital display 13.

The contact block 31 of the contact point 3 is formed on the basis of a cone as shown in FIGS. 2 and 3 and described in detail in the case of the first embodiment. Though the angle θ between the axis (the straight line L) and the generatrix of the cone is 45 degrees in the first embodiment, an arbitrary angle (in the range of an acute angle) is acceptable in the second embodiment.

Figure 8:
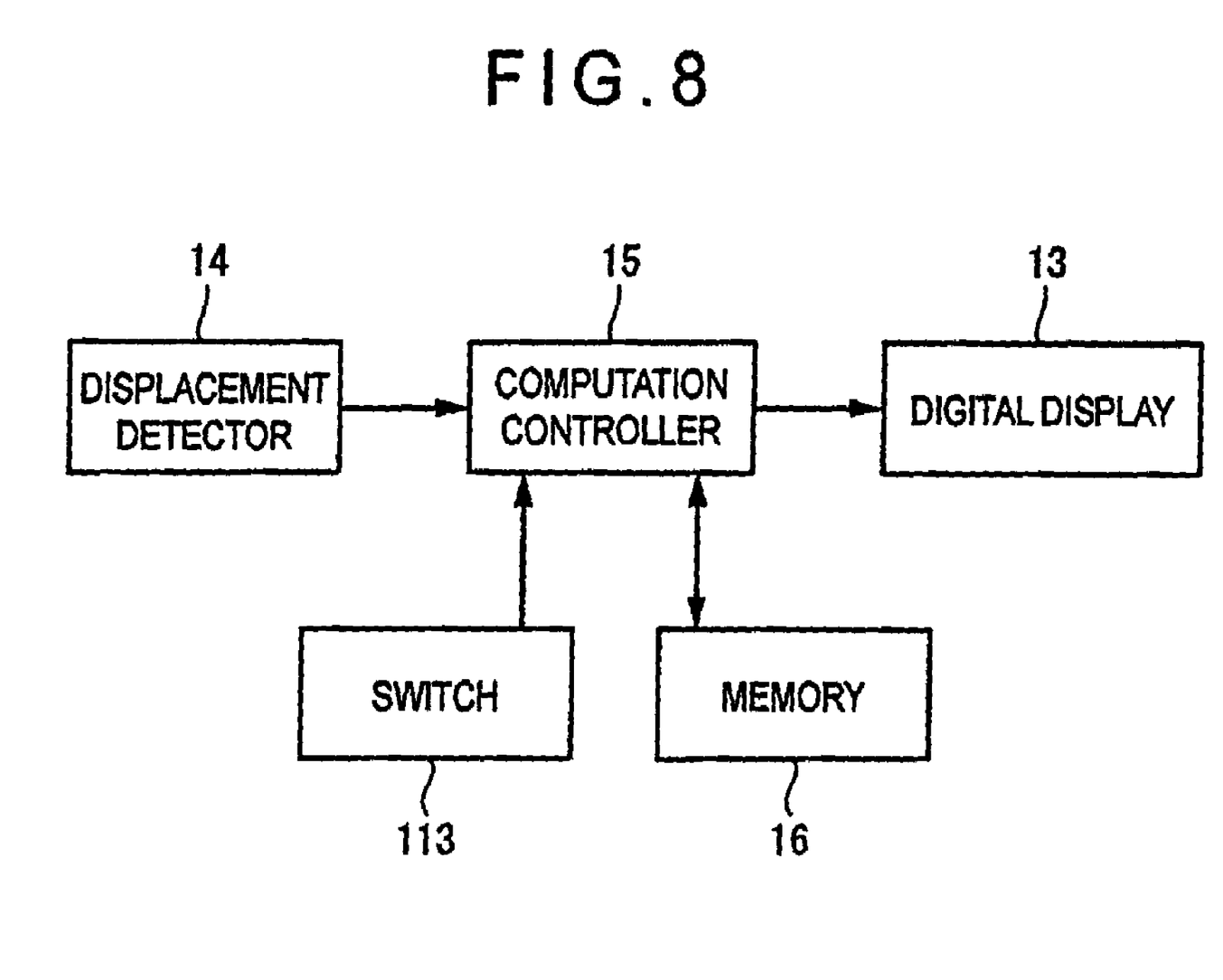
FIG. 8 is a block diagram showing a circuit structure in the second embodiment.

FIG. 8 is a block diagram showing the circuit structure in the second embodiment Explanations of the figure are made hereunder along the measurement procedure. Firstly, a measuring mode is selected by operating the mode selection switch 113C of the switch unit 113. Successively, numerical values that are necessary for the measurement are stored in the memory 16 through the computation controller 15 by operating the preset switch 113D. Here, the numerical values that are necessary for the measurement mean the value of θ at the time of ordinary gap measurement and the values of θ and R at the time of R-compensation gap measurement. Concrete measurement using those values is explained later.

Subsequently, measurement is carried out by making a contact point abut a workpiece. In the measurement, firstly the displacement of the spindle 12 is detected by the displacement detector 14 and input into the computation controller 15. The computation controller 15 computes in accordance with each measuring mode on the basis of the input displacement and the numerical values (θ and R) stored in the memory 16 and the computed results are output to the digital display 13. More specifically, the computation controller 15: outputs the input displacement as it is in the case of a step measuring mode; computes on the basis of the input displacement and the value of θ and outputs the computed gap in the case of a gap measuring mode; and computes on the basis of the input displacement and the values of θ and R and outputs the computed gap in the case of an R-compensation gap measuring mode.

Successively, measurement by using a step and gap measuring instrument of the present embodiment is explained. Step measurement can be done by setting the mode selection switch 113C at the step measuring mode and carrying out the measurement as shown in FIG. 5.

Figure 9:
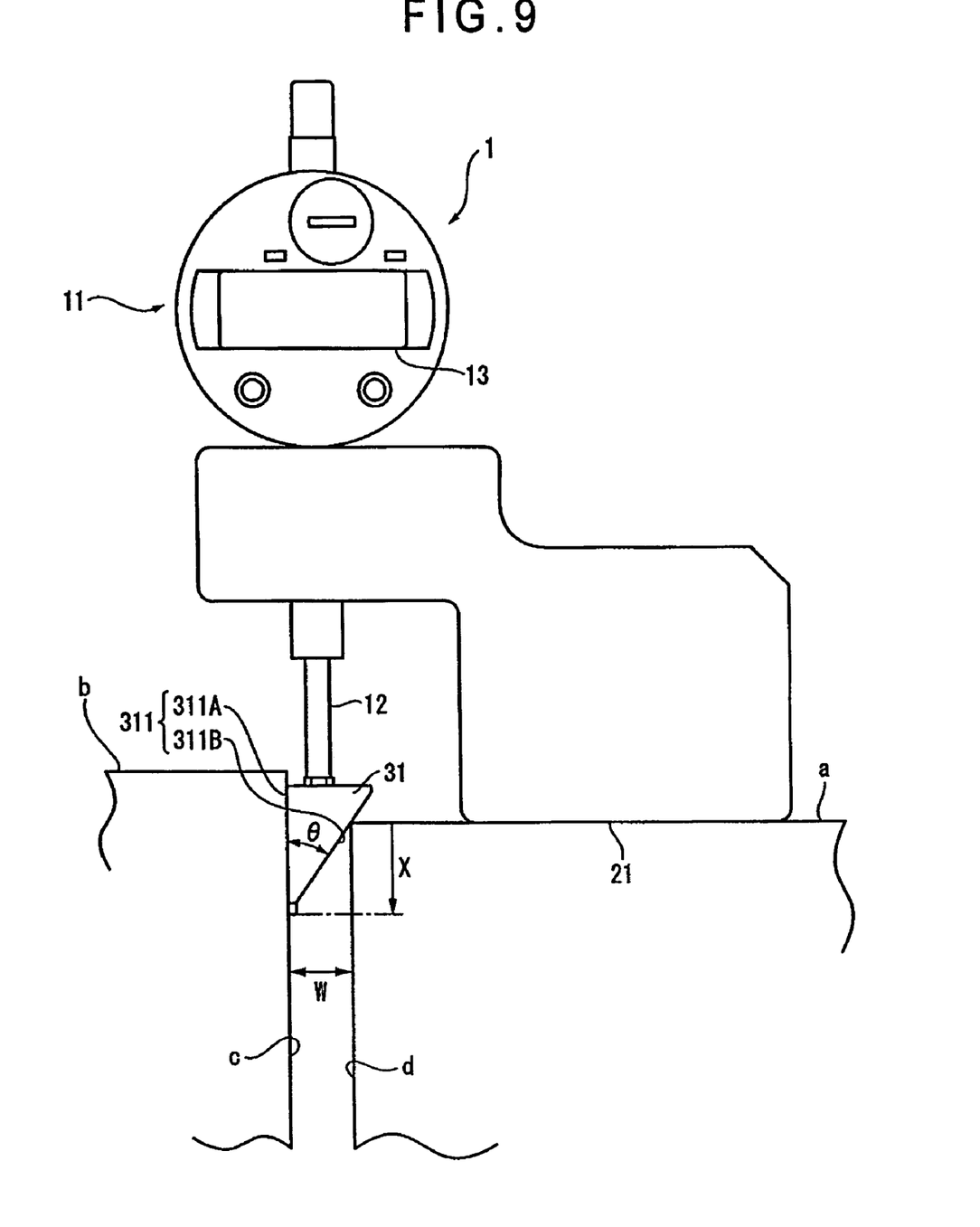
FIG. 9 is a view showing the state of gap measurement in a gap measuring mode in the second embodiment.

In gap measurement, there are two modes as mentioned earlier. Firstly, gap measurement in an ordinary gap measuring mode is explained. The measuring mode is suitable for use in the case where the opposed faces composing a gap are flat faces and in similar cases. The state of the measurement is shown in FIG. 9. As shown in FIG. 9, the gap W is expressed by the equation W=X tan θ by using the displacement X of the spindle 12. The computation controller 15 computes with the above equation on the basis of the value of X detected by the displacement detector 14 and the value of θ stored beforehand in the memory 16 and then outputs the computed value W to the digital display 13. As a consequence, an operator can directly read the gap W.

Figure 10:
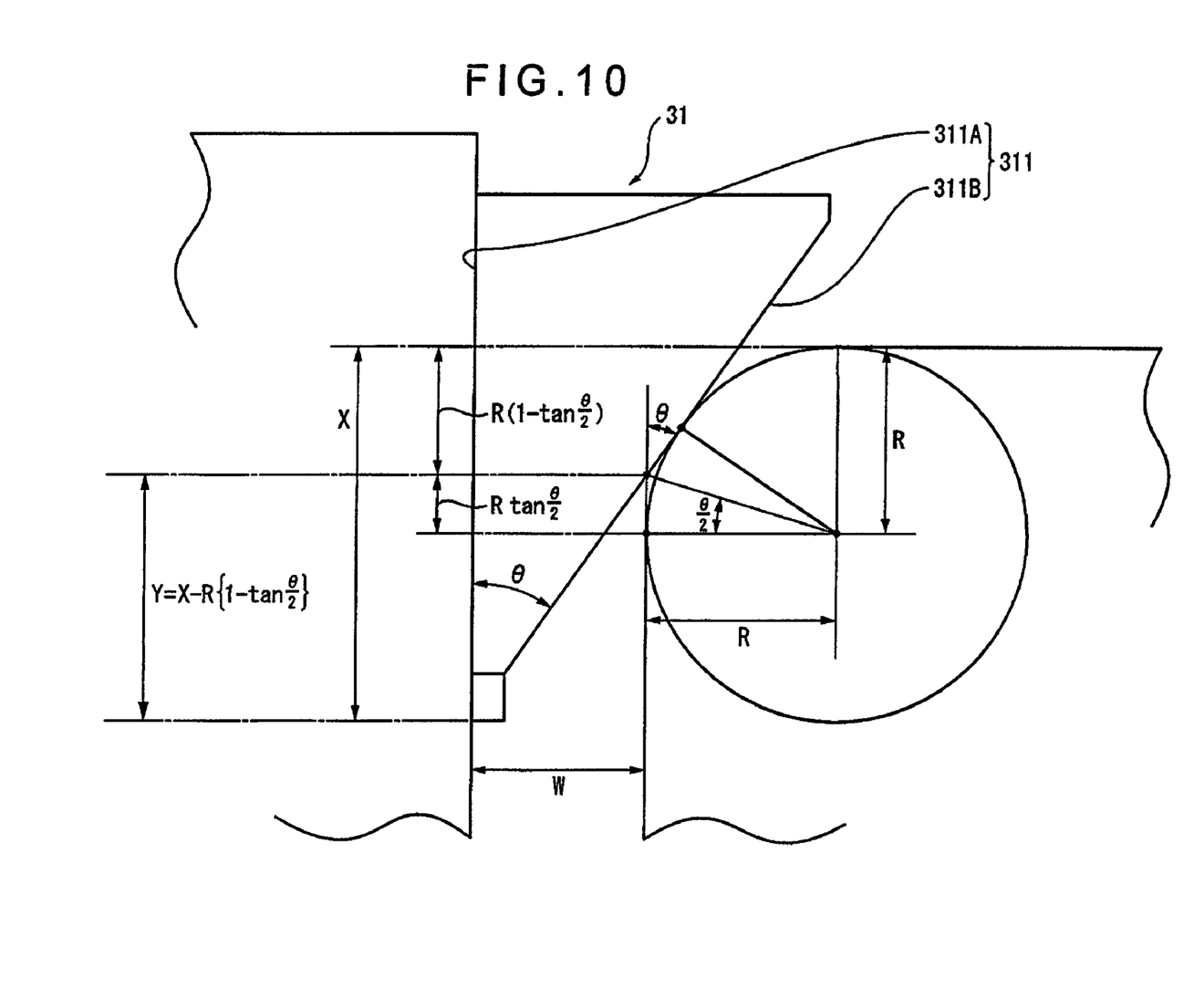
FIG. 10 is an enlarged fragmentary view showing the state of gap measurement in an R-compensation gap measuring mode in the second embodiment.

Next, gap measurement in an R-compensation gap measuring mode is explained. As explained earlier, the mode is used for gap measurement in the case where an opposed face composing a gap forms a circular arc contour line of a radius R FIG. 10 shows the measurement state wherein the gap measuring portion 311 touches the two opposed faces composing the gap. The conical face portion 311B of the gap measuring portion 311 abuts the portion of the circular arc contour line of a radius R on an opposed face composing the gap. In the state, the gap W is expressed by the equation W=Y tan θ by using the reference character Y in FIG. 10. Here, as shown in FIG. 10, the equation Y=X−R{1−tan(θ/2)} stands. Consequently, the value of W is expressed with the displacement X of the spindle 12 and the values of θ and R stored in the memory 16 beforehand. The computation controller 15 computes on the basis of the above equation to obtain the value of W, and outputs the results to the digital display 13. As a consequence, an operator can directly read the gap W.

The second embodiment produces the following effects in addition to those listed in the first embodiment:

(8) Once an operator selects an appropriate measuring mode by operating the mode selection switch 113C and carries out measurement, he/she can know a step height or a gap merely by reading out the value displayed on the digital display 13. That is, since it is unnecessary for the operator to compute on the basis of the values θ and R in order to obtain the gap, an amount of time and effort in the measurement can be eliminated.

(9) The angle θ between the axis and the generatrix of the conical contact block 31 may be an arbitrary angle (in the range of an acute angle). Consequently, whatever the value of θ is, as far as the value is stored in the memory 16 by operating the preset switch 113D, the step and gap can be measured in the present embodiment. As a result, once a plurality of contact points having various values of θ are prepared beforehand, it becomes possible to select a contact point most suitable for the measurement in accordance with the shape of a workpiece and the usability in the measurement improves.

Note that the present invention is not limited to the aforementioned embodiments and includes modifications, improvements and the like as long as they are in the ranges where the object of the present invention is attained.

Figure 11:
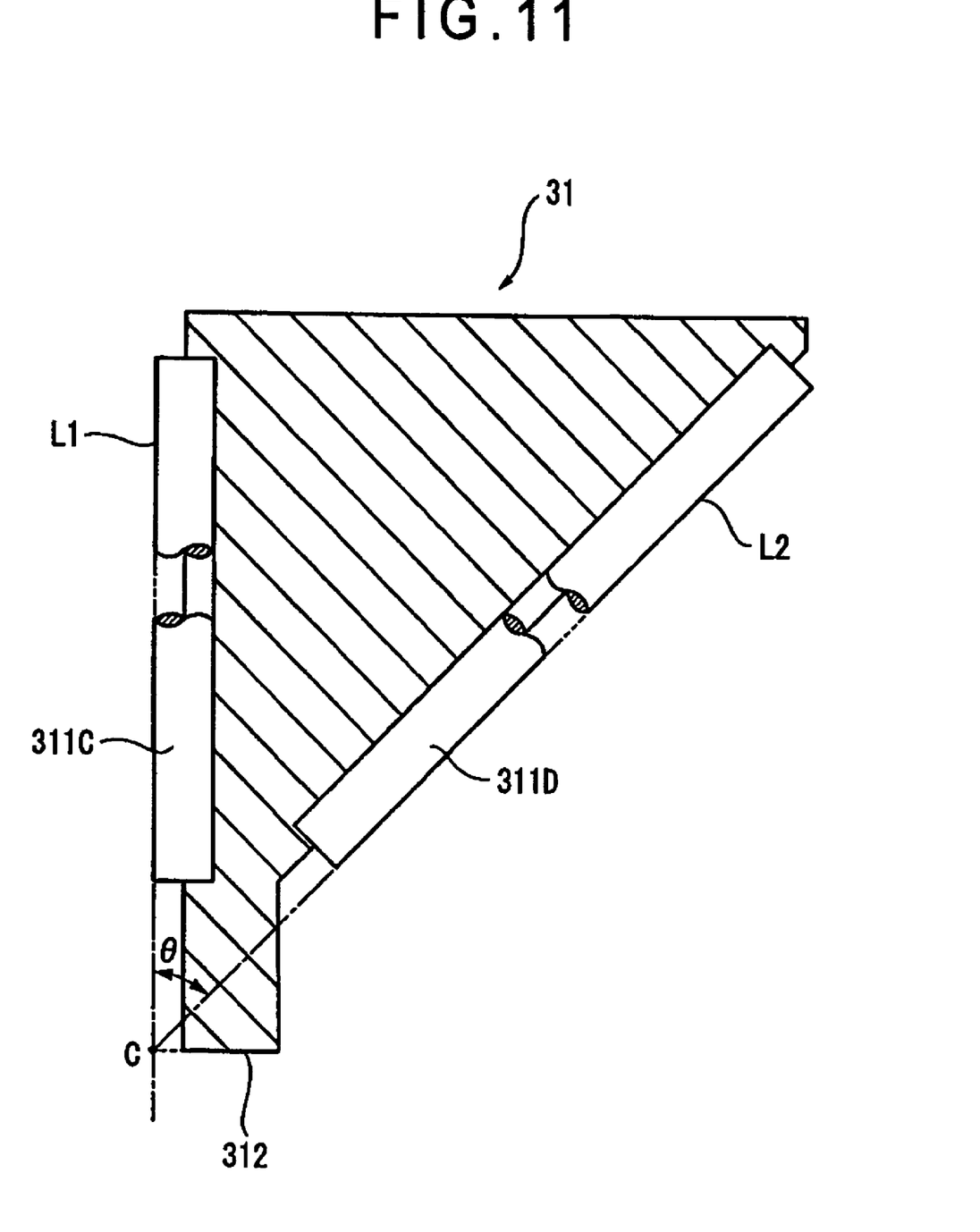
FIG. 11 is a sectional view showing another example of a measuring portion according to the present invention.

Though the above embodiment is based on the contact block 31 of a conical shape, such a contact block as shown in FIG. 11 may be employed in the present invention. That is, in FIG. 11, the contact block 31 is provided with a columnar member 311C having the axis parallel with the axial direction of the spindle 12 (the vertical direction in FIG. 11) and the columnar member 31 1D having the axis that forms an angle of θ with the axis of the columnar member 311C. In the contact block 31, one contour line is the outermost protruding line L1 of the columnar member 311C and the other contour line is the outermost protruding line L2 of the columnar member 311D. Then, the step measuring portion 312 is formed at the same height as the intersection C of the extension of line L1 and line L2.

With the contact block 31, since the side faces of the columnar members 311C and 311D abut a workpiece during gap measurement, the workpiece is hardly damaged. Further, even in the case of measuring the inner diameter of a circular hole, since the side face of a columnar member can be inscribed in the inner wall of the circular hole, the inner side can be measured accurately. Furthermore, since a columnar member can be produced easily, the contact block 31 can also be produced easily and thus the production cost decreases.

In addition, in the present invention, any gap measuring portion can be adopted as far as it is provided with one contour line parallel with the axial direction of the spindle and the other contour line that comes closer to the one contour line according as it is directed away from the case body toward one end of the spindle, and it is unnecessary that the other contour line is such a straight line (the generatrix of a cone in the first and second embodiments) as in the case of the aforementioned embodiments. That is, in the present invention, a contact point of such a special shape that the other contour line is a curved line may be adopted.

In this case, as far as the step and gap measuring instrument is configured so that the memory 16 can store the information on the special shape of the contact point with the preset switch 113D and also the computation controller 15 computes on the basis of the displacement of the spindle 12 and the information on the special shape of the contact point stored in the memory 16, computes the gap, and displays the results on the digital display 13, then an operator can directly read the gap even when the contact point is of a special shape.

A step and gap measuring instrument of such a configuration makes it possible to select a contact point having a shape most suitable for measurement among contact points of various shapes in accordance with the shape of a workpiece at the time of the measurement and improve the usability in the measurement.

The priority application Number JP2004-023039 upon which this patent application is based is hereby incorporated by reference.

The invention claimed is:

1. A step and gap measuring instrument, comprising:
a case body;
a spindle disposed on the case body, said spindle defining an axis and being disposed on the case body so as to be movable in an axial direction;
a contact point being disposed at one end of the spindle and abutting a workpiece;
a retainer that retains the case body in a predetermined posture;
a displacement detector that detects displacement of the spindle; and
a display that displays the displacement detected by the displacement detector, wherein:
the contact point is provided with a step measuring portion and a gap measuring portion which abut the workpiece;
the gap measuring portion is formed into a shape that contains one contour line and an other contour line that abut the workpiece during gap measurement;
the one contour line extends parallel to the axial direction of the spindle;

the other contour line is a straight line that forms an angle with the one contour line; and the step measuring portion is formed at an intersection of an extension of the one contour line and an extension of the other contour line.

2. The step and gap measuring instrument according to claim 1, wherein the angle formed between the other contour line and the one contour line is a 45° angle.

3. The step and gap measuring instrument according to claim 1, further comprising:
   a computation controller that computes the gap of the workpiece based upon the displacement of the spindle detected by the displacement detector and a shape of the contact point at the time of gap measurement; and
   a display switching section that makes the display show the displacement of the spindle detected by the displacement detector at the time of step measurement and the gap computed by the computation controller at the time of gap measurement.

4. The step and gap measuring instrument according to claim 1, wherein at least either the one contour line or the other contour line is formed on a curved face portion of a surface of the contact point.

5. The step and gap measuring instrument according to claim 4, wherein:
   the contact point is provided with one columnar member and an other columnar member;
   one contour line is formed on a side surface of the one columnar member in an axial direction thereof; and
   the other contour line is formed on a side surface of the other columnar member in an axial direction thereof.

6. The step and gap measuring instrument according to claim 1, wherein the step measuring portion is a flat face perpendicular to the axial direction of the spindle.

* * * * *